United States Patent
Kamijo et al.

(10) Patent No.: US 10,044,295 B2
(45) Date of Patent: Aug. 7, 2018

(54) PIEZOELECTRIC ACTUATOR AND ROBOT

(71) Applicant: Seiko Epson Corporation, Tokyo (JP)

(72) Inventors: Koichi Kamijo, Matsumoto (JP); Osamu Miyazawa, Shimosuwa (JP)

(73) Assignee: Seiko Epson Corporation (JP)

( * ) Notice: Subject to any disclaimer, the term of this patent is extended or adjusted under 35 U.S.C. 154(b) by 481 days.

(21) Appl. No.: 14/695,555

(22) Filed: Apr. 24, 2015

(65) Prior Publication Data

US 2015/0318801 A1     Nov. 5, 2015

(30) Foreign Application Priority Data

Apr. 30, 2014     (JP) ................. 2014-093407

(51) Int. Cl.
| | |
|---|---|
| *H02N 2/04* | (2006.01) |
| *H02N 2/00* | (2006.01) |
| *H02N 2/10* | (2006.01) |
| *B25J 9/12* | (2006.01) |
| *H02N 2/02* | (2006.01) |

(52) U.S. Cl.
CPC .............. *H02N 2/004* (2013.01); *B25J 9/12* (2013.01); *H02N 2/003* (2013.01); *H02N 2/008* (2013.01); *H02N 2/0075* (2013.01); *H02N 2/026* (2013.01); *H02N 2/103* (2013.01); *H02N 2/006* (2013.01)

(58) Field of Classification Search
USPC .................. 310/323.02–323.07, 316.02, 319
See application file for complete search history.

(56) References Cited

U.S. PATENT DOCUMENTS

| | | | | |
|---|---|---|---|---|
| 5,136,200 A | * | 8/1992 | Takizawa ............... | H02N 2/003 310/323.16 |
| 5,453,653 A | | 9/1995 | Zumeris | |
| 5,616,980 A | * | 4/1997 | Zumeris ............. | G11B 7/08576 310/317 |
| 5,682,076 A | | 10/1997 | Zumeris | |
| 5,714,833 A | | 2/1998 | Zumeris | |
| 5,777,423 A | | 7/1998 | Zumeris | |
| 5,877,579 A | | 3/1999 | Zumeris | |
| 5,917,268 A | * | 6/1999 | Takagi ................... | H02N 2/004 310/317 |
| 5,932,952 A | * | 8/1999 | Takagi .................. | H02N 2/004 310/316.02 |

(Continued)

FOREIGN PATENT DOCUMENTS

| | | |
|---|---|---|
| JP | 64-089979 A | 4/1989 |
| JP | 08-237971 A | 9/1996 |

(Continued)

*Primary Examiner* — Thomas Dougherty
*Assistant Examiner* — Karen B Addison
(74) *Attorney, Agent, or Firm* — Harness, Dickey & Pierce, P.L.C.

(57) ABSTRACT

A piezoelectric actuator includes a piezoelectric element, a vibrating plate configured to vibrate according to application of a signal to the piezoelectric element, and a driven body driven by the vibration of the vibrating plate. The vibrating plate vibrates in a first mode according to a signal having a first frequency, vibrates in a second mode according to a signal having a second frequency, and vibrates in a third mode according to a signal having a third frequency. The first frequency and the second frequency are different. The first frequency and the third frequency are different.

6 Claims, 8 Drawing Sheets

(56) References Cited

U.S. PATENT DOCUMENTS

| | | | |
|---|---|---|---|
| 6,064,140 | A | 5/2000 | Zumeris |
| 7,663,292 | B2 | 2/2010 | Adachi |
| 2004/0080243 | A1 | 4/2004 | Miyazawa |
| 2005/0212386 | A1 | 9/2005 | Miyazawa |
| 2005/0285481 | A1 | 12/2005 | Miyazawa |

FOREIGN PATENT DOCUMENTS

| | | |
|---|---|---|
| JP | 2003-070270 A | 3/2003 |
| JP | 2003-259670 A | 9/2003 |
| JP | 2007-189900 A | 7/2007 |
| JP | 2013-146122 A | 7/2013 |
| JP | 2013-146152 A | 7/2013 |
| WO | WO-03-077410 A1 | 9/2003 |
| WO | WO-2007-080851 A1 | 7/2007 |

\* cited by examiner

PIEZOELECTRIC ACTUATOR AND ROBOT

BACKGROUND

1. Technical Field

The present invention relates to a piezoelectric actuator.

2. Related Art

A piezoelectric actuator is a driving device including a piezoelectric element that converts a driving voltage such as a high-frequency alternating-current voltage into mechanical vibration and a driven body driven by the piezoelectric element. As a form of the piezoelectric actuator, there is known a piezoelectric actuator including a rotor or a longitudinal member as the driven body (e.g., JP-A-2007-189900 (Patent Literature 1)). The piezoelectric actuator transmits bending vibration of the piezoelectric element via a projection, which projects from a vibrating body including the piezoelectric element, and rotates the rotor in a predetermined direction.

In the piezoelectric actuator described in Patent Literature 1, the projection of the vibrating body vibrates to draw an elliptical track. The piezoelectric actuator changes a vibration pattern of the vibrating body according to selection of an energization pattern to electrodes of the vibrating body and changes the direction of the vibration of the projection of the vibrating body. Consequently, the piezoelectric actuator can rotate the rotor in both the directions of a forward direction and a backward direction (counterclockwise and clockwise). In the piezoelectric actuator described in Patent Literature 1, the vibrating body is urged to the rotor by a coil spring.

Such a piezoelectric actuator attracts attention as a driving source for sections of robots such as joints of a robot. When the robot is taught, the piezoelectric actuator is stopped and force is applied from the outside to bend and stretch the joints of the robot.

However, in the piezoelectric actuator described in Patent Literature 1, when the robot is taught, since the piezoelectric actuator stops and the projection of the vibrating body is always in contact with the rotor, the rotor is braked. Therefore, it is necessary to apply force exceeding the retention of the brake to the rotor. When the driving source of the robot includes a reduction gear, larger force is necessary because of a reduction ratio of the reduction gear. For example, when the robot is taught, a delicate motion of manual feeling or the like with a technical skill, the manual feeling is less easily accurately transmitted if the retention is large.

SUMMARY

An advantage of some aspects of the invention is to provide a piezoelectric actuator that can easily and surely displace a driven body when it is attempted to displace the driven body with an external force other than the force of the piezoelectric actuator.

The invention can be implemented as the following aspects or application examples.

Application Example 1

A piezoelectric actuator according to this application example includes: a piezoelectric element; a vibrating plate configured to vibrate according to application of a signal to the piezoelectric element; and a driven body driven by the vibration of the vibrating plate. The vibrating plate vibrates in a first mode according to a signal having a first frequency, vibrates in a second mode according to a signal having a second frequency, and vibrates in a third mode according to a signal having a third frequency. The first frequency and the second frequency are different. The first frequency and the third frequency are different.

With this configuration, when the vibration in the third mode is, for example, longitudinal vibration, since the vibrating plate performs the longitudinal vibration, it is possible to reduce a frictional force between the vibrating plate and the driven body without displacing the driven body and compared with a non-driven state. Consequently, when it is attempted to displace the driven body with external force other than the force of the piezoelectric actuator, it is possible to easily and surely displace the driven body. Therefore, for example, if the piezoelectric actuator according to this application example is applied to a robot and used as a driving source for joints of the robot, when the robot is taught, by causing the vibrating plate to perform the longitudinal vibration, it is possible to easily and surely bend and stretch the joints of the robot with the external force. Consequently, it is possible to easily and surely teach the robot.

Since vibrating plate performs the vibration in the first mode, it is possible to displace the driven body.

Since the first frequency and the second frequency are different and the first frequency and the third frequency are different, it is possible to vibrate the vibrating plate in the respective modes at optimum frequencies. Therefore, it is possible to increase the magnitudes of the vibrations in the respective modes. Consequently, since the vibrating plate vibrates in the third mode, it is possible to further reduce the frictional force between the vibrating plate and the driven body.

Application Example 2

In the piezoelectric actuator according to this application example, it is preferable that the vibration in the third mode is longitudinal vibration.

With this configuration, it is possible to more surely reduce the frictional force between the vibrating plate and the driven body without displacing the driven body and compared with the non-driven state.

Application Example 3

In the piezoelectric actuator according to this application example, it is preferable that the vibration in the second mode is bending vibration, and the vibration in the first mode is combined vibration of the bending vibration and the longitudinal vibration.

With this configuration, since the vibrating plate performs the combined vibration, it is possible to efficiently displace the driven body.

Application Example 4

In the piezoelectric actuator according to this application example, it is preferable that the piezoelectric actuator includes a plurality of electrodes provided in the piezoelectric element, and, when the vibrating plate is vibrated in the third mode, the signal is applied to the plurality of electrodes.

With this configuration, it is possible to easily and surely vibrate the vibrating plate in the third mode and greatly vibrate the vibrating plate.

Application Example 5

In the piezoelectric actuator according to this application example, it is preferable that, when the vibrating plate is vibrated in the third mode, the magnitude of an electric current supplied to the piezoelectric element is controlled.

When a total area of the electrodes applied with the signal increases, the impedance of the piezoelectric element during resonance of the vibrating plate decreases. Consequently, when voltage control for controlling the magnitude of a voltage applied to the piezoelectric element is adopted, the electric current (electric power) supplied to the piezoelectric element increases and a heat value in the piezoelectric element increases. When the heat value increases, depending on other conditions, the impedance of the piezoelectric element during the resonance of the vibrating plate further decreases, the electric current supplied to the piezoelectric element further increases, and the vibration of the vibrating plate becomes unstable.

On the other hand, in the piezoelectric actuator according to this application example, since current control for controlling the magnitude of the electric current supplied to the piezoelectric element is adopted, compared with a case where the voltage control is adopted, it is possible to reduce the heat value in the piezoelectric element. Consequently, it is possible to suppress the decrease in the impedance of the piezoelectric element during the resonance of the vibrating plate, stabilize the vibration, and reduce power consumption.

Application Example 6

In the piezoelectric actuator according to this application example, it is preferable that the piezoelectric actuator includes a plurality of electrodes provided in the piezoelectric element, and, when the vibrating plate is vibrated in the third mode, the signal is applied to a part of the plurality of electrodes.

With this configuration, compared with a case where the signal is applied to all the electrodes to vibrate the vibrating plate in the third mode, it is possible to increase the impedance of the piezoelectric element during the resonance of the vibrating plate. Consequently, it is possible to stabilize the vibration and reduce power consumption.

Application Example 7

In the piezoelectric actuator according to this application example, it is preferable that the driven body is rotatably provided, and a vibrating direction of the vibration in the third mode in a contact portion of the vibrating plate with the driven body is a direction toward a rotation center of the driven body.

With this configuration, it is possible to suppress the driven body from rotating when the vibrating plate vibrates in the third mode.

Application Example 8

In the piezoelectric actuator according to this application example, it is preferable that the driven body is movably provided, and a moving direction of a contact portion of the driven body with the vibrating plate and a vibrating direction of the vibration in the third mode are orthogonal to each other.

With this configuration, it is possible to suppress the driven body from moving when the vibrating plate vibrates in the third mode.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention are explained in detail below with reference to the accompanying drawings.

First Embodiment

Figure 1:
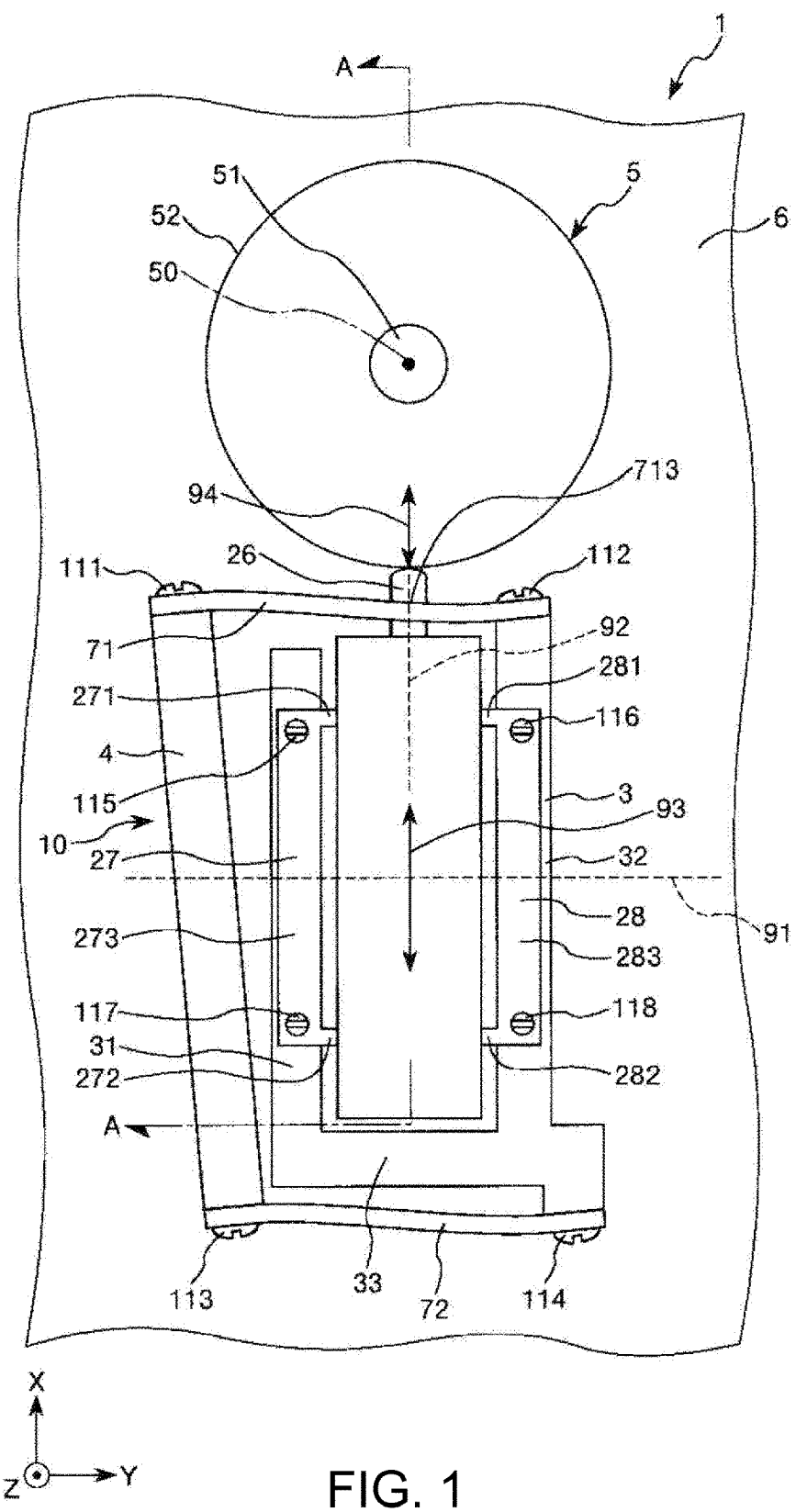
FIG. 1 is a plan view showing a piezoelectric actuator according to a first embodiment of the invention.
Figure 2:
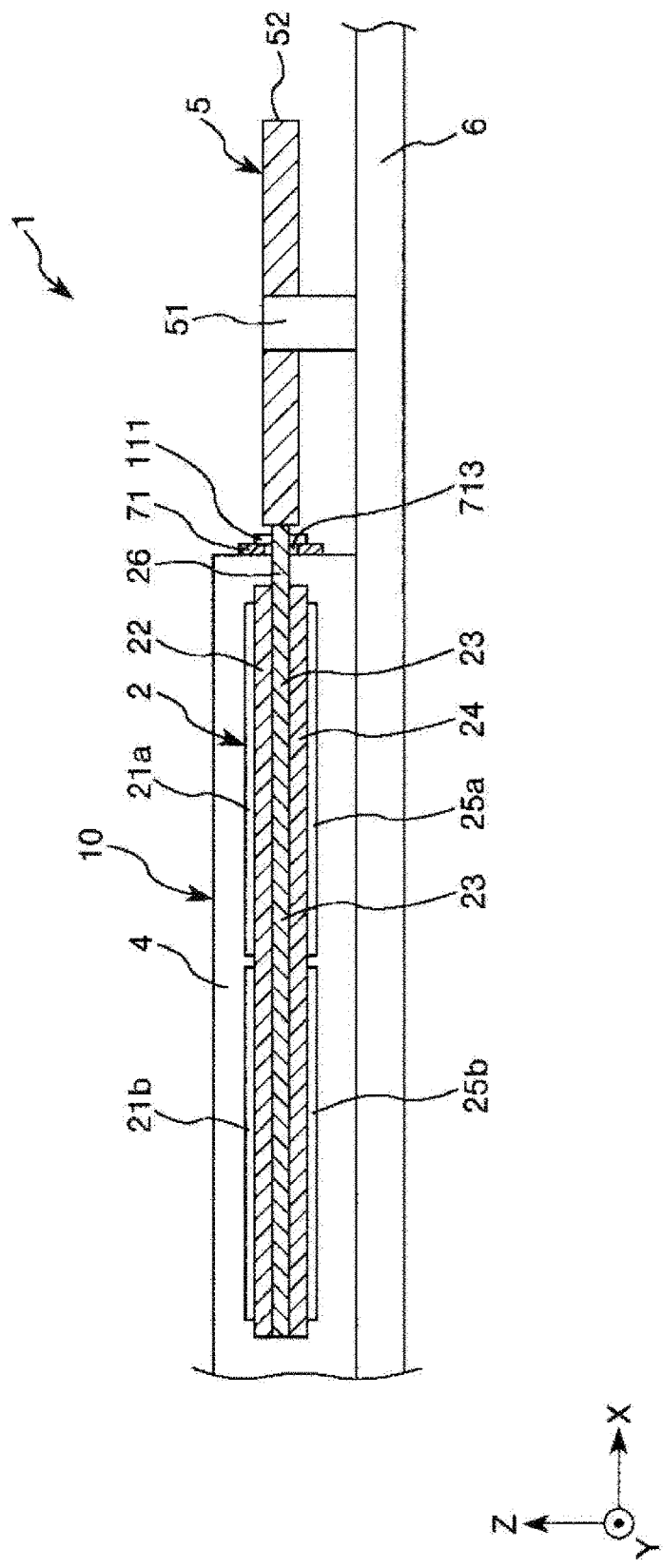
FIG. 2 is a sectional view taken along line A-A in FIG. 1.
Figure 3:
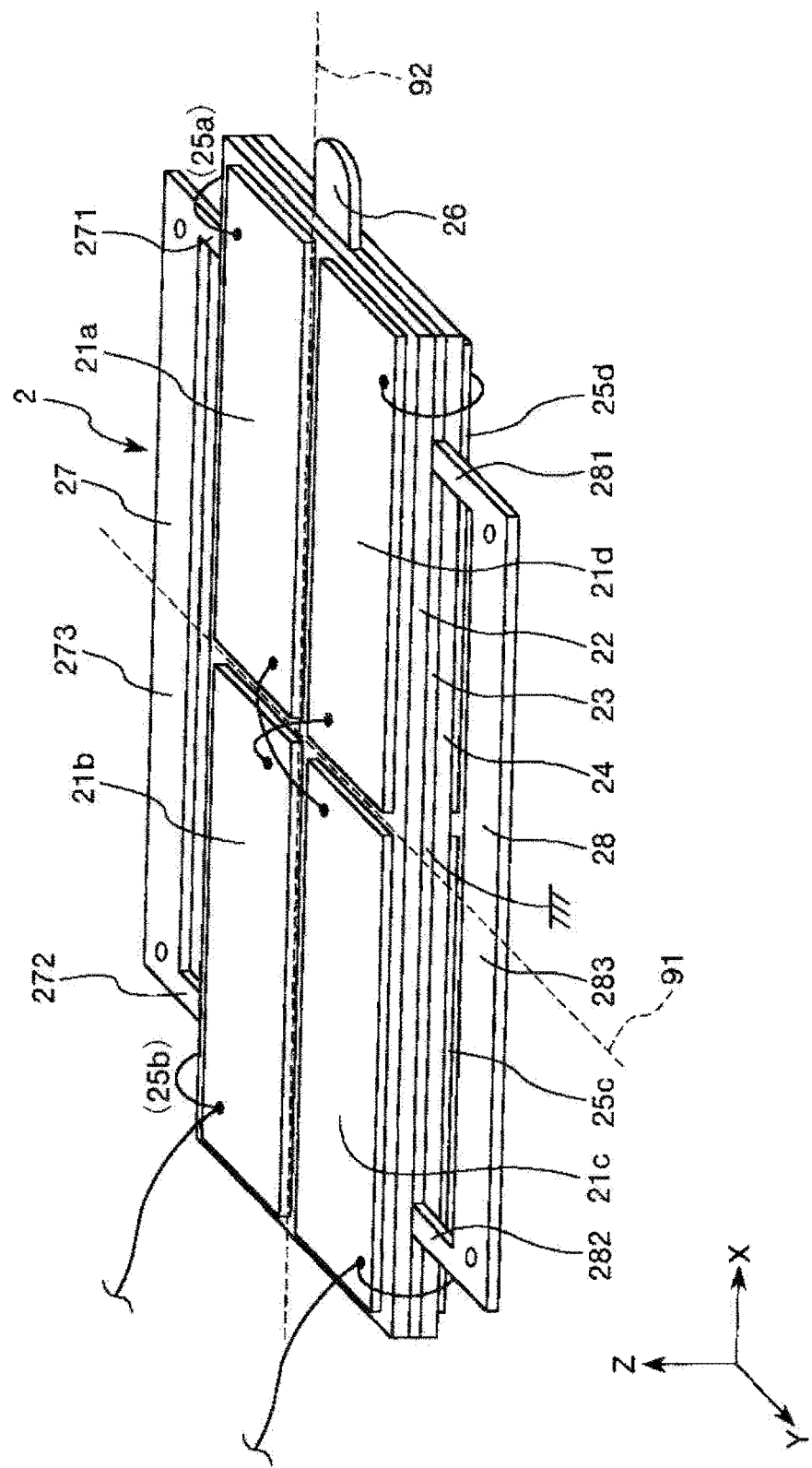
FIG. 3 is a perspective view of a vibrating body of the piezoelectric actuator shown in FIG. 1.
Figure 4:
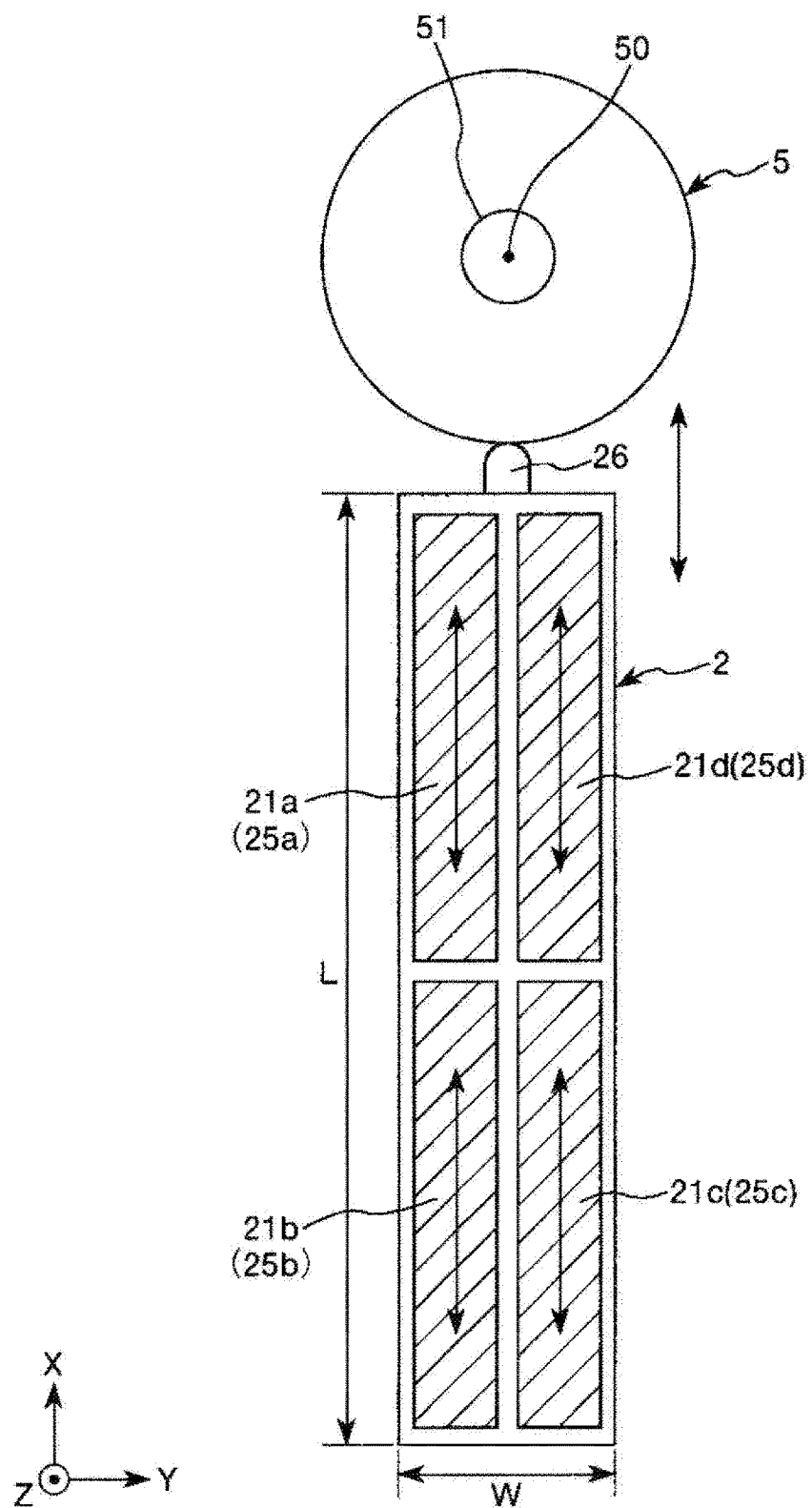
FIG. 4 is a diagram of the vibrating body for explaining the operation of the piezoelectric actuator shown in FIG. 1.
Figure 5:
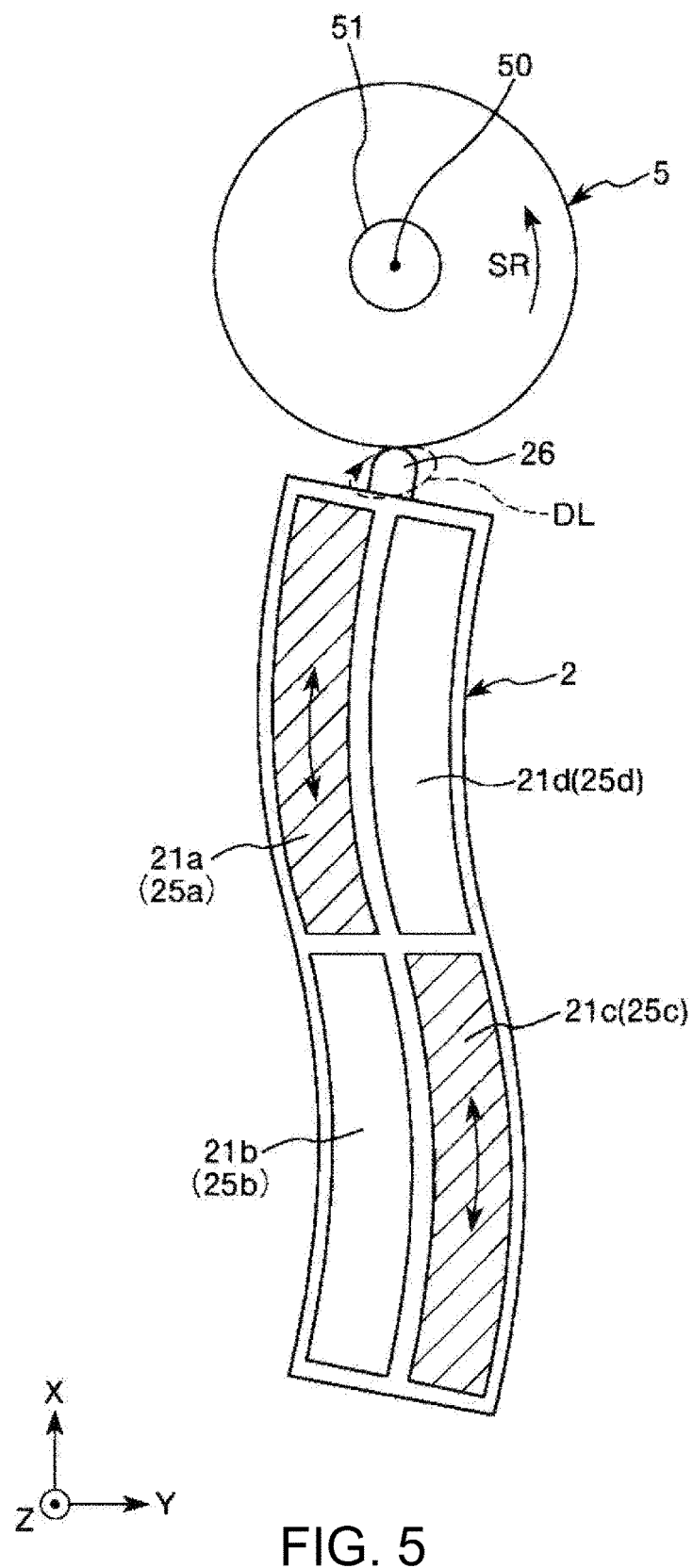
FIG. 5 is a diagram of the vibrating body for explaining the operation of the piezoelectric actuator shown in FIG. 1.
Figure 6:
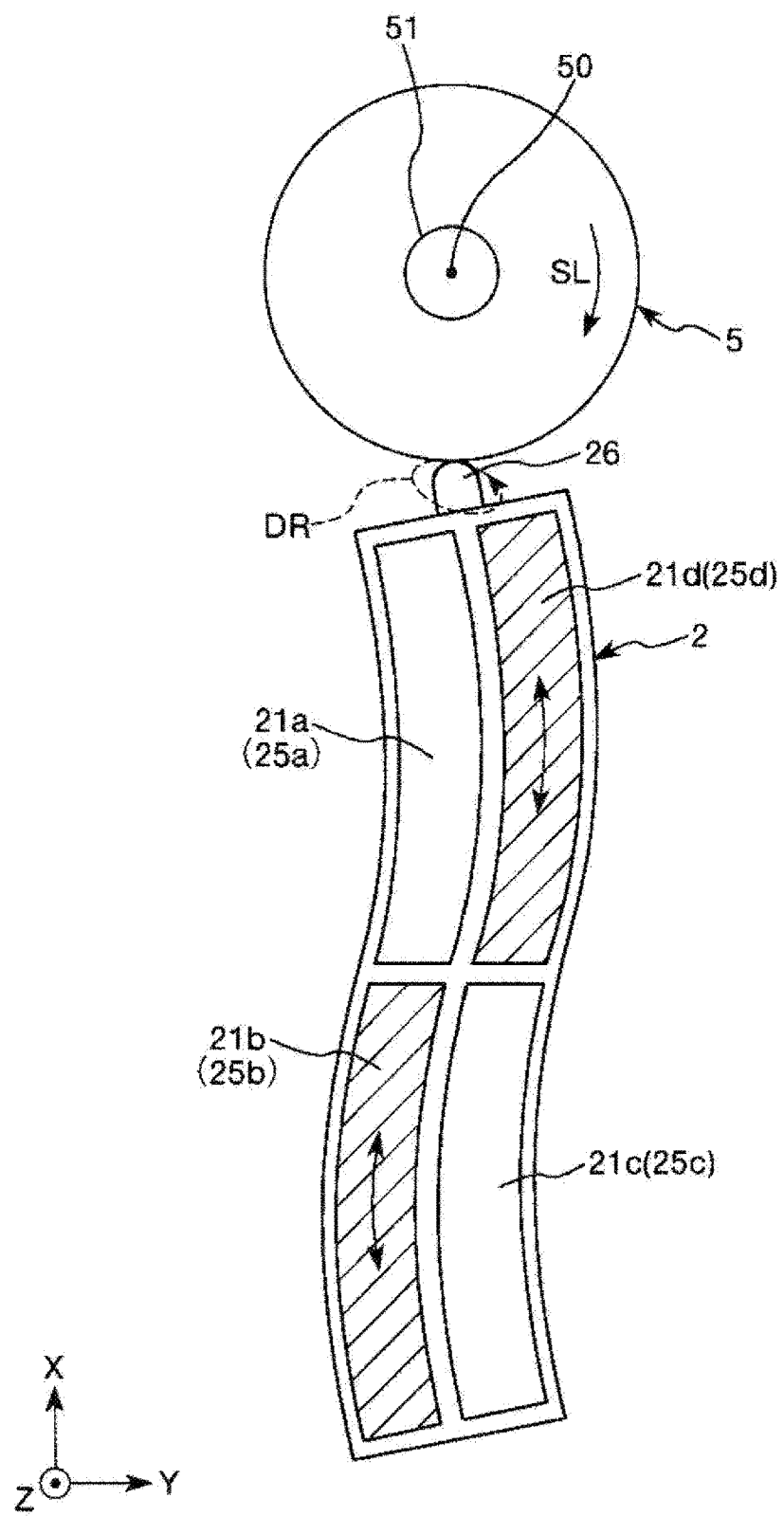
FIG. 6 is a diagram of the vibrating body for explaining the operation of the piezoelectric actuator shown in FIG. 1.

FIG. 1 is a plan view showing a piezoelectric actuator according to a first embodiment of the invention. FIG. 2 is a sectional view taken along line A-A in FIG. 1. FIG. 3 is a perspective view of a vibrating body of the piezoelectric actuator shown in FIG. 1. FIG. 4 is a diagram of the vibrating body for explaining the operation of the piezoelectric actuator shown in FIG. 1. FIG. 5 is a diagram of the vibrating body for explaining the operation of the piezoelectric actuator shown in FIG. 1. FIG. 6 is a diagram of the vibrating body for explaining the operation of the piezoelectric actuator shown in FIG. 1.

In the following explanation, for convenience of explanation, the upper side in FIGS. 2 to 4 is referred to as "upper" or "upward" and the lower side in FIGS. 2 to 4 is referred to as "lower" or "downward" (the same applies in FIG. 7).

In FIGS. 1 to 6, as three axes orthogonal to one another, an X axis, a Y axis, and a Z axis are shown. A direction parallel to the X axis is referred to as "X-axis direction", a direction parallel to the Y axis is referred to as "Y-axis direction", and a direction parallel to the Z axis is referred to as "Z-axis direction". A plane defined by the X axis and the Y axis is referred to as "XY plane", a plane defined by the Y axis and the Z axis is referred to as "YZ plane", and a plane defied by the Z axis and the X axis is referred to as "XZ plane". In the X-axis direction, the Y-axis direction, and the Z-axis direction, an arrow distal end side is set as a "+ (plus) side" and an arrow proximal end side is set as a "− (minus) side". Note that the longitudinal directions of a vibrating body, a vibrating plate, a piezoelectric element, and electrodes are the X-axis direction, the lateral directions (the width directions) thereof are the Y-axis direction, and the thickness directions thereof are the Z-axis direction (the same applies in FIGS. 7 and 8).

Figure 7:
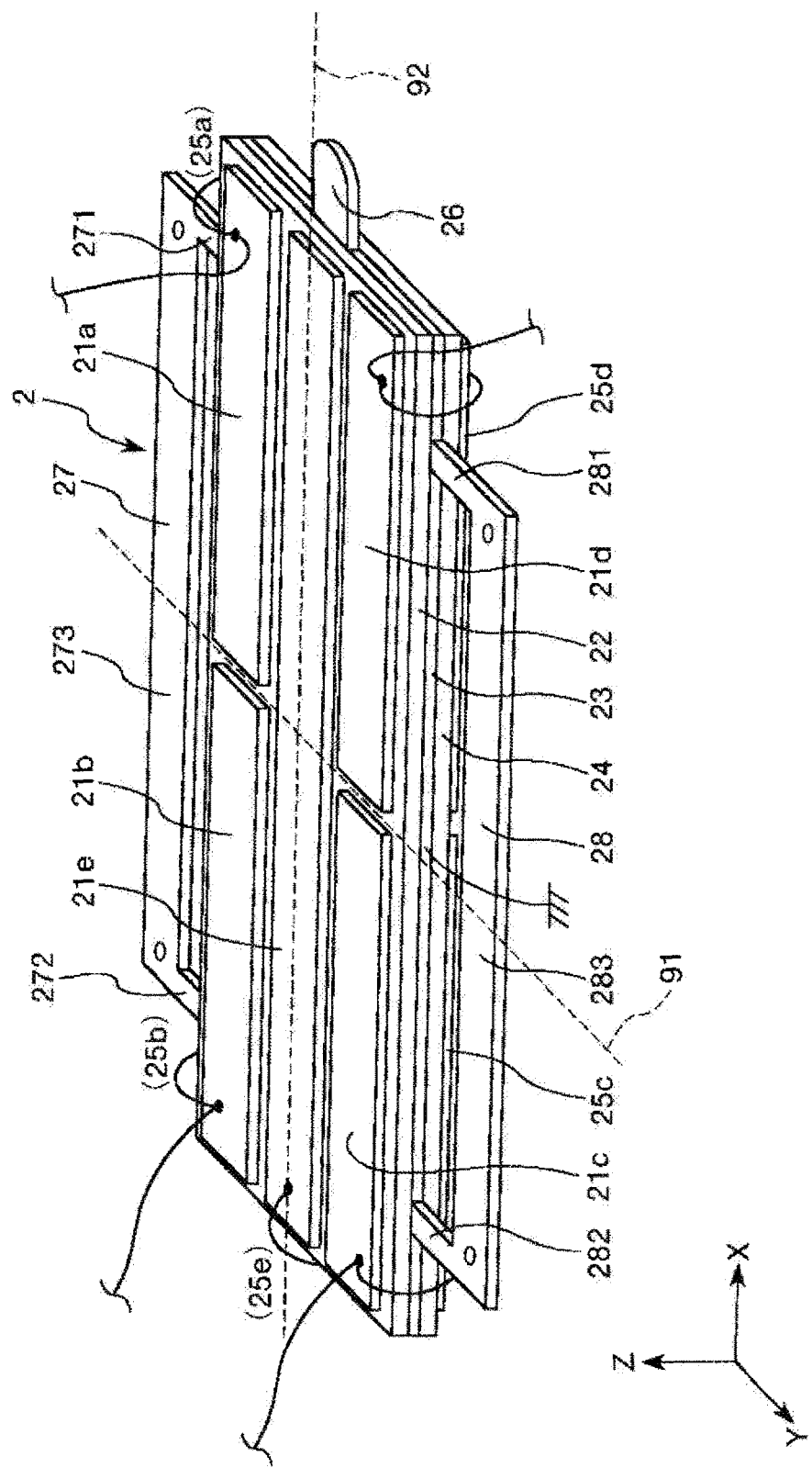
FIG. 7 is a perspective view showing a vibrating body of a piezoelectric actuator according to a second embodiment of the invention.
Figure 8:
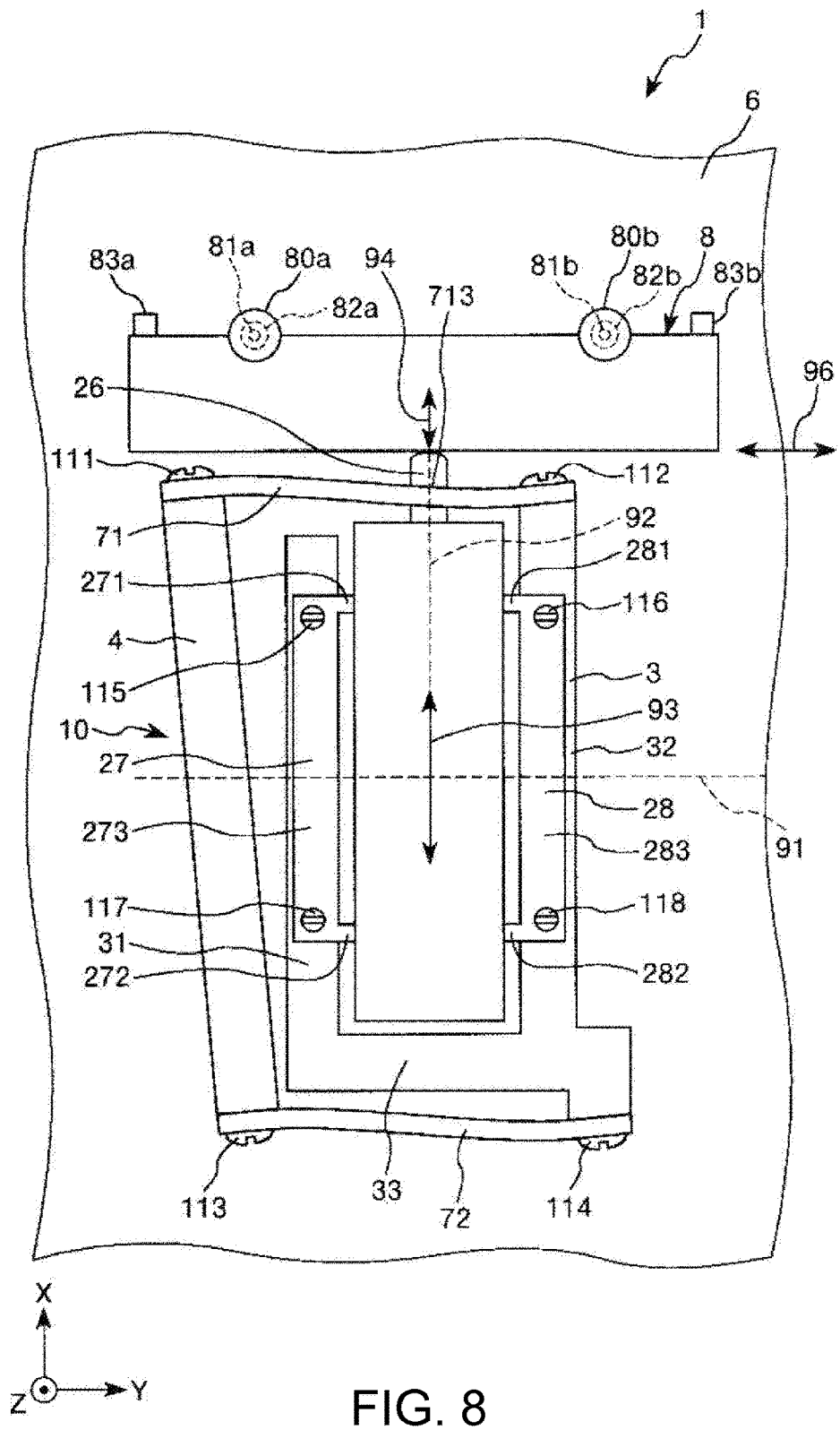
FIG. 8 is a plan view showing a piezoelectric actuator according to a third embodiment of the invention.

In FIG. 1, the electrodes of the vibrating body are not shown (the same applies in FIG. 8). In FIGS. 4 to 6, the vibrating body is simplified and shown, for example, not to show a coupling section (the same applies in FIG. 7).

In FIGS. 4 to 6, electrodes to be energized among the electrodes of the vibrating body are hatched.

In FIGS. 3 to 6, concerning electrodes not seen on the rear side among the electrodes of the vibrating body, only reference signs are shown in parentheses (the same applies in FIG. 7).

Basic Configuration

A piezoelectric actuator 1 includes a vibrating section 10 including a vibrating body 2 that vibrates according to application of a voltage, a rotatable (displaceable) disk-like rotor (a driven body) 5, and a supporting body 6 that supports the vibrating section 10 and the rotor 5. Note that, in other words, the rotor 5 is a driven body having a circular cross sectional shape.

The piezoelectric actuator 1 is a device in which the vibrating body 2 vibrates to thereby transmit power (a driving force) to the rotor 5 and rotate (drive) the rotor 5. Sections of the piezoelectric actuator 1 are sequentially explained below.

Vibrating Section 10

The vibrating section 10 includes the vibrating body 2, a holding section (a holding mechanism) 3 that holds the vibrating body 2 to be capable of vibrating, a base 4, and a pair of leaf springs (elastic bodies) 71 and 72 functioning as urging sections that urge the vibrating body 2 toward the rotor 5. In this embodiment, the pair of leaf springs (elastic bodies) 71 and 72 couples the holding section 3 and the base 4 and urges a projection 26 explained below of the vibrating body 2 toward the rotor 5 via the holding section 3.

Vibrating Body 2

The vibrating body 2 is formed in a rectangular plate shape. The vibrating body 2 is configured by stacking, in order from the upper side in FIGS. 2 and 3, four electrodes 21a, 21b, 21c, and 21d, a tabular piezoelectric element 22, a vibrating plate (a shim) 23, which is a reinforcing plate, including a projection (a contact section) 26 and a pair of coupling sections 27 and 28, a tabular piezoelectric element 24, and four electrodes 25a, 25b, 25c, and 25d (in FIG. 3, the electrodes 25a and 25b are not shown and only the reference signs are shown in parentheses). Note that, in FIGS. 2 and 3, the thickness direction is shown in exaggeration.

The vibrating body 2 vibrates according to deformation of the piezoelectric elements 22 and 24 by application of a voltage, transmits power to the rotor 5 via the projection 26, and rotates the rotor 5.

The piezoelectric elements 22 and 24 are respectively formed in rectangular shapes and respectively fixedly attached to both the surfaces of the vibrating plate 23.

The piezoelectric elements 22 and 24 expand or contract in the longitudinal direction thereof according to application of a voltage. When the application of the voltage is stopped, the piezoelectric elements 22 and 24 return to the original shapes thereof.

Constituent materials of the piezoelectric elements 22 and 24 are respectively not particularly limited. Various materials such as lead zirconate titanate (PZT), quartz, lithium niobate, barium titanate, lead titanate, lead metaniobate, polyvinylidene fluoride, lead zinc niobate, and scandium lead niobate can be used.

The upper surface of the piezoelectric element 22 is substantially equally divided into four rectangular regions, that is, divided into two in the X-axis direction and divided into two in the Y-axis direction. The electrodes 21a, 21b, 21c, and 21d formed in a rectangular shape are respectively set in the divided four regions. Note that the electrodes 21a, 21b, 21c, and 21d are separated from one another.

Similarly, the lower surface of the piezoelectric element 24 is substantially equally divided into four rectangular regions, that is, divided into two in the X-axis direction and divided into two in the Y-axis direction. The electrodes 25a, 25b, 25c, and 25d formed in a rectangular shape are respectively set in the divided four regions. Note that the electrodes 25a, 25b, 25c, and 25d are separated from one another.

The electrodes 21a, 21b, 21c, and 21d are disposed symmetrically with respect to a predetermined first straight line 91 extending in a direction different from a vibrating direction of longitudinal vibration (vibration in a third mode) explained below and are disposed symmetrically with respect to a predetermined second straight line 92 extending in the vibrating direction of the longitudinal vibration. Similarly, the electrodes 25a, 25b, 25c, and 25d are disposed symmetrically with respect to the predetermined first straight line 91 extending in the direction different from the vibrating direction of the longitudinal vibration and are disposed symmetrically with respect to the predetermined second straight line 92 extending in the vibrating direction of the longitudinal vibration.

Note that, in this embodiment, a vibrating direction 93 of the longitudinal vibration of the vibrating body 2 (the vibrating plate 23) is the X-axis direction. A direction orthogonal to the vibrating direction 93 of the longitudinal vibration is the Y-axis direction. A vibrating direction 94 of the longitudinal vibration in a contact portion of the projection 26 of the vibrating body 2 with the rotor 5 is a direction toward a rotation center 50 of the rotor 5. A direction different from the vibrating direction 93 of the longitudinal vibration is a direction orthogonal to the vibrating direction 93 of the longitudinal vibration, that is, the Y-axis direction. The first straight line 91 extends in the Y-axis direction. The first straight line 91 passes a center portion of the piezoelectric elements 22 and 24 in the X-axis direction (the vibrating direction 93 of the longitudinal vibration). The second straight line 92 passes a center portion of the piezoelectric elements 22 and 24 in the Y-axis direction (the direction orthogonal to the vibrating direction 93 of the longitudinal vibration).

The electrode 21a and the electrode 25a, the electrode 21b and the electrode 25b, the electrode 21c and the electrode 25c, and the electrode 21d and the electrode 25d are respectively disposed to be opposed to each other in the thickness direction of the vibrating body 2. As shown in FIG. 3, all of the electrodes 21a and 21c on one diagonal line and the electrodes 25a and 25c located on the rear side of the electrodes 21a and 21c are electrically connected. Similarly, all of the electrodes 21b and 21d on the other diagonal line and the electrodes 25b and 25d located on the rear side of the electrodes 21b and 21d are electrically connected.

The vibrating plate 23 has a function of reinforcing the entire vibrating body 2 and prevents the vibrating body 2 from being damaged by overamplitude, external force, and the like. A constituent material of the vibrating plate 23 is not particularly limited. However, the constituent material of the vibrating plate 23 is preferably various metal materials such as stainless steel, aluminum or an aluminum alloy, titanium or a titanium alloy, copper or a copper alloy.

The vibrating plate 23 is preferably thinner than the piezoelectric elements 22 and 24. Consequently, it is possible to vibrate the vibrating body 2 at high efficiency.

The vibrating plate 23 is grounded (connected to ground potential) and has a function of an electrode common to the piezoelectric elements 22 and 24. That is, a voltage is applied to the piezoelectric element 22 by predetermined electrodes among the electrodes 21a, 21b, 21c, and 21d and the vibrating plate 23. A voltage is applied to the piezoelectric element 24 by predetermined electrodes among the electrodes 25a, 25b, 25c, and 25d and the vibrating plate 23.

Note that the vibrating plate 23 does not have to be used as the common electrode for the piezoelectric elements 22 and 24. For example, common electrodes for the piezoelectric element 22 and the piezoelectric element 24 may be further provided respectively between the vibrating plate 23 and the piezoelectric element 22 and between the vibrating plate 23 and the piezoelectric element 24.

The projection 26 is integrally formed at one end portion (an end portion on the rotor 5 side) in the longitudinal direction of the vibrating plate 23. In other words, the piezoelectric elements 22 and 24 are provided on a side opposite to the rotor 5 of the projection 26.

The projection 26 is located in a center portion in the width direction (the Y-axis direction) of the vibrating body 2 (the vibrating plate 23). The distal end of the projection 26 is formed in a semicircular shape in plan view. Note that it goes without saying that the shape and the position of the projection 26 are not limited to the position and the shape.

The projection 26 comes into contact with the rotor 5 and separates from the rotor 5 according to the vibration of the vibrating body 2.

Coupling sections 27 and 28 that couple the vibrating plate 23 to the holding section 3 to enable the vibrating body 2 to vibrate are respectively integrally formed at both the end portions in the width direction of the vibrating plate 23. The coupling sections 27 and 28 are disposed to be symmetrical to each other on the right side and the left side in FIG. 1 of the vibrating plate 23.

The coupling section 27 is formed in a rectangular shape and includes an attachment section 273 attached to the holding section 3 explained below and supporting sections 271 and 272 that are formed at both the end portions in the longitudinal direction of the attachment section 273 and couple the vibrating plate 23 to the attachment section 273 and support the vibrating plate 23 to enable the vibrating body 2 to vibrate. Similarly, the coupling section 28 is formed in a rectangular shape and includes an attachment section 283 attached to the holding section 3 and supporting sections 281 and 282 that are formed at both the end portions in the longitudinal direction of the attachment section 283 and couple the vibrating plate 23 to the attachment section 283 and support the vibrating plate 23 to enable the vibrating body 2 to vibrate. Note that the supporting sections 271, 272, 281, and 282 are disposed in the positions of nodes of combined vibration (vibration in a first mode) and bending vibration (vibration in a second mode) explained below of the vibrating body 2 (the vibrating plate 23).

Holding Section 3

The holding section 3 is configured not to hinder the vibration of the vibrating body 2 and holds the vibrating body 2 to be capable of vibrating. The holding section 3 includes a pair of columns 31 and 32 disposed to be separated from each other and a coupling section 33 that couples an end portion on the upper side of the column 31 and an end portion on the lower side of the column 32. The column 32 is disposed on a side further away from the base 4 than the column 31. The end portion on the lower side of the column 32 projects in a direction away from the column 31.

The vibrating body 2 is disposed between the column 31 and the column 32. The attachment section 273 of the coupling section 27 on the left side in FIG. 1 is fixed to the column 31 by screws 115 and 117 in positions corresponding to the supporting sections 271 and 272. The attachment section 283 of the coupling section 28 on the right side in FIG. 1 is fixed to the column 32 by screws 116 and 118 in positions corresponding to the supporting sections 281 and 282.

A constituent material of the holding section 3 is not particularly limited. For example, various metal materials and various ceramic materials can be used.

Base 4

The base 4 supports the holding section 3, which holds the vibrating body 2, via the pair of leaf springs 71 and 72. The base 4 is fixed to the supporting body 6. The shape of the base 4 is not particularly limited. However, in this embodiment, the shape of the cross section of the base 4 is formed in a substantially square bar shape, that is, a substantially rectangular parallelepiped long in one direction.

Leaf Springs 71 and 72

The pair of leaf springs 71 and 72 is separated from each other. In a state in which the leaf springs 71 and 72 sandwich the entire holding section 3, the leaf springs 71 and 72 couple the holding section 3 and the base 4. In this case, one end portion (on the left side in FIG. 1) of the leaf spring 71 is fixed to the end portion on the upper side of the base 4 by a screw 111. The other end portion (on the right side in FIG. 1) of the leaf spring 71 is fixed to the end portion on the upper side of the column 31 of the holding section 3 by a screw 112. Similarly, one end portion (on the left side in FIG. 1) of the leaf spring 72 is fixed to the end portion on the lower side of the base 4 by a screw 113. The other end portion (on the right side in FIG. 1) of the leaf spring 72 is fixed to the end portion on the lower side of the column 32 of the holding section 3 by a screw 114.

The leaf springs 71 and 72 are elastically deformed and urge the holding section 3, which holds the vibrating body 2, toward the rotor 5. That is, the leaf springs 71 and 72 urge the projection 26 of the vibrating body 2 toward the rotor 5 via the holding section 3. Consequently, it is possible to efficiently perform power transmission to the rotor 5 by the vibrating body 2.

The shapes of the leaf springs 71 and 72 are not particularly limited. However, in this embodiment, the leaf springs 71 and 72 are formed in an S shape.

Rotor 5

The rotor 5 is disposed forward in the X-axis direction of the vibrating section 10 having the configuration explained above.

The rotor 5 is held to be rotatable in a forward direction (clockwise) and a backward direction (counterclockwise), which is the opposite direction of the forward direction, around the bar-like shaft section 51 erected in the supporting body 6.

The projection 26 repeatedly comes into contact with an outer circumferential surface 52 of the rotor 5 according to the vibration of the vibrating body 2.

The basic configuration of the piezoelectric actuator 1 is explained above.

Driving

The operation of the piezoelectric actuator 1 is explained.

The piezoelectric actuator 1 has, as driving modes thereof, a first driving mode (a teaching mode) in which the piezoelectric actuator 1 is driven but the rotor 5 is not rotated by the vibration of the vibrating body 2 and a second driving mode (a normal driving mode) in which the piezoelectric actuator 1 is driven to rotate the rotor 5. Note that, in the first driving mode, "the rotor 5 is not rotated" means that the rotor 5 is not actively rotated and does not exclude slight rotation of the rotor 5.

The piezoelectric actuator 1 has, as vibration modes of the vibrating body 2 (the vibrating plate 23), a mode of bending vibration, which is vibration in a second mode, a mode of longitudinal vibration, which is vibration in a third mode, and a mode of combined vibration of the bending vibration and the longitudinal vibration, which is vibration in a first mode. The vibrating body 2 (the vibrating plate 23) vibrates in the first mode according to a signal having a first frequency, vibrates in the second mode according to a signal having a second frequency, and vibrates in the third mode according to a signal having a third frequency. The first frequency, the second frequency, and the third frequency are frequencies different from one another. In the first driving mode, the piezoelectric actuator 1 vibrates the vibrating body 2 in the third mode. In the second driving mode, the piezoelectric actuator 1 vibrates the vibrating body 2 in the first mode.

The second frequency is not particularly limited as long as the second frequency is a frequency at which the bending vibration occurs. The second frequency is set as appropriate according to conditions. However, when a resonance frequency of the bending vibration is represented as f2, the second frequency is preferably f2±5% and more preferably f2±3%. Consequently, it is possible to obtain larger vibration.

The third frequency is not particularly limited as long as the third frequency is a frequency at which the longitudinal vibration occurs. The third frequency is set as appropriate according to conditions. However, when a resonance frequency of the longitudinal vibration is represented as f3, the third frequency is preferably f3±5% and more preferably f3±3%. Consequently, it is possible to obtain larger vibration. Note that whichever of f2 and f3 is higher.

The first frequency is not particularly limited as long as the first frequency is a frequency at which the combined vibration of the bending vibration and the longitudinal vibration occurs. The first frequency is set as appropriate according to conditions. However, the first frequency is preferably a frequency between the resonance frequency f2 of the vending vibration and the resonance frequency f3 of the longitudinal vibration. Consequently, it is possible to obtain larger vibration.

The longitudinal vibration is vibration in the X-axis direction, which is the longitudinal direction of the vibrating body 2 (the vibrating plate 23) (the piezoelectric elements 22 and 24). The longitudinal vibration is not limited to single vibration and may include other vibration components equal to or smaller than a predetermined amount.

The combined vibration is vibration obtained by combining the bending vibration and the longitudinal vibration. The combined vibration may include other vibration components equal to or smaller than a predetermined amount other than the bending vibration and the longitudinal vibration.

The first driving mode (the teaching mode) and the second driving mode (the normal driving mode) are further explained below.

In the first driving mode, the piezoelectric actuator 1 applies a predetermined signal to (energizes) predetermined electrodes of the vibrating body 2, that is, applies a positive voltage to the predetermined electrodes at a fixed cycle to vibrate (longitudinally vibrate) the vibrating body 2 (the vibrating plate 23) such that the projection 26 reciprocatingly moves along the X-axis direction.

In the first driving mode, in this embodiment, all of the electrodes 21*a*, 21*b*, 21*c*, 21*d*, 25*a*, 25*b*, 25*c*, and 25*d* are energized. Consequently, it is possible to easily and surely longitudinally vibrate the vibrating body 2. Since all the electrodes are energized, it is possible to greatly vibrate the vibrating body 2.

In the first driving mode, since the vibrating body 2 (the vibrating plate 23) performs the longitudinal vibration, it is possible to markedly reduce retention of the projection 26 of the vibrating body 2 acting on the rotor 5 compared with a case where the piezoelectric actuator 1 is in a non-driven state (stopped) without being driven. Consequently, when it is attempted to rotate the rotor 5 with external force other than the force of the piezoelectric actuator 1, it is possible to easily and surely rotate the rotor 5.

For example, application of the piezoelectric actuator 1 to a driving source for joints of a robot is explained as an example. In the first driving mode, when the piezoelectric actuator 1 is driven in the second driving mode to rotate the rotor 5, whereby the robot performs predetermined work, the piezoelectric actuator 1 is used by an operator to perform, for example, work for manually bending or stretching the joints of the robot to perform alignment in advance (in the following explanation, this work is referred to as teaching or teaching work). A position aligned by the teaching work is stored in a storing unit of a not-shown control device as position information such as coordinates.

Note that, in the first driving mode, a part of the electrodes 21*a*, 21*b*, 21*c*, 21*d*, 25*a*, 25*b*, 25*c*, and 25*d*, for example, the electrodes 21*a*, 21*d*, 25*a*, and 25*d* may be energized.

In the second driving mode, the piezoelectric actuator 1 applies a predetermined signal to (energizes) predetermined electrodes of the vibrating body 2, that is, applies a positive voltage to the predetermined electrodes at a fixed cycle to vibrate the vibrating body 2 (the vibrating plate 23) differently from the longitudinal vibration. In this embodiment, the piezoelectric actuator 1 vibrates the vibrating body 2 (the vibrating plate 23) (the combined vibration) such that the projection 26 draws an elliptical track. The piezoelectric actuator 1 rotates the rotor 5 according to the vibration.

In the second driving mode, a part of the electrodes 21*a*, 21*b*, 21*c*, 21*d*, 25*a*, 25*b*, 25*c*, and 25*d*, in this embodiment, the electrodes 21*a*, 21*c*, 25*a*, and 25*c* or the electrodes 21*b*, 21*d*, 25*b*, and 25*d* are energized.

A reason why the projection 26 reciprocatingly moves along the X-axis direction in the first driving mode and the projection 26 draws an elliptical track in the second driving mode is explained below.

Movement of the Projection 26

As explained above, the piezoelectric elements 22 and 24 repeat the application of the positive voltage and the release of the application of the positive voltage (apply positive charges at a fixed cycle) to repeat an operation for expanding in the longitudinal direction thereof and an operation for returning to the original shapes (an operation for contracting from an expanded state).

In the first driving mode, when the electrodes 21*a*, 21*b*, 21*c*, 21*d*, 25*a*, 25*b*, 25*c*, and 25*d* are energized at a fixed cycle and the positive voltage is applied at a fixed cycle between the electrodes 21*a*, 21*b*, 21*c*, 21*d*, 25*a*, 25*b*, 25*c*, and 25*d* and the vibrating plate 23, portions of the piezoelectric element 22 corresponding to the electrodes 21*a*, 21*b*, 21*c*, and 21*d* and portions of the piezoelectric element 24 corresponding to the electrodes 25*a*, 25*b*, 25*c*, and 25*d* repeat contraction and expansion.

According to such expansion and contraction, the entire vibrating body 2 performs longitudinal vibration (stretching vibration) shown in FIG. 4 along the X-axis direction in the XY plane.

When a frequency for applying a voltage is changed, a stretching amount suddenly increases at a certain specific frequency and a kind of resonance phenomenon occurs. A frequency at which resonance is caused by the longitudinal vibration, that is, the resonance frequency f3 is determined according to conditions such as a physical property of the vibrating body 2 and dimensions (width W, length L, and thickness T) of the vibrating body 2.

In the second driving mode, when the electrodes 21a, 21c, 25a, and 25c are energized at a fixed cycle and the positive voltage is applied at a fixed cycle between the electrodes 21a, 21c, 25a, and 25c and the vibrating plate 23, portions of the piezoelectric element 22 corresponding to the electrodes 21a and 21c and portions of the piezoelectric element 24 corresponding to the electrodes 25a and 25c repeat contraction and expansion.

On the other hand, the electrodes 21b, 21d, 25b, and 25d are not energized. Therefore, portions of the piezoelectric element 22 corresponding to the electrodes 21b and 21d and portions of the piezoelectric element 24 corresponding to the electrodes 25b and 25d do not contract or expand.

According to such expansion and contraction, the entire vibrating body 2 performs combined vibration (apparently, bending vibration) of the bending vibration and the longitudinal vibration shown in FIG. 5 in the XY plane.

When the voltage is applied in the form shown in FIG. 5 in this way, as shown in FIG. 5, the vibrating body 2 vibrates such that the projection 26 draws an elliptical track (a first elliptical track) indicated by an arrow DL (clockwise on the drawing).

In the second driving mode, when the electrodes 21b, 21d, 25b, and 25d are energized at a fixed cycle and the positive voltage is applied at a fixed cycle between the electrodes 21b, 21d, 25b, and 25d and the vibrating plate 23, portions of the piezoelectric element 22 corresponding to the electrodes 21b and 21d and portions of the piezoelectric element 24 corresponding to the electrodes 25b and 25d repeat contraction and expansion.

On the other hand, the electrodes 21a, 21c, 25a, and 25c are not energized. Therefore, portions of the piezoelectric element 22 corresponding to the electrodes 21a and 21c and portions of the piezoelectric element 24 corresponding to the electrodes 25a and 25d do not contract or expand.

According to such expansion and contraction, the entire vibrating body 2 performs combined vibration (apparently, bending vibration) of the bending vibration and the longitudinal vibration shown in FIG. 6 in the XY plane.

When the voltage is applied in the form shown in FIG. 6 in this way, as shown in FIG. 6, the vibrating body 2 vibrates such that the projection 26 draws an elliptical track (a second elliptical track) indicated by an arrow DR (counterclockwise on the drawing).

Note that the resonance frequency f2 of the bending vibration in the combined vibration shown in FIGS. 5 and 6 is also determined according to conditions such as the physical property of the vibrating body 2 and the dimensions (the width W, the length L, and the thickness T) of the vibrating body 2.

Note that, in the above explanation, the positive voltage is applied to the vibrating body 2. However, the piezoelectric elements 22 and 24 are also deformed by application of a negative voltage. Therefore, vibration may be generated by applying the negative voltage to the vibrating body 2 or may be generated by applying an alternating voltage, which repeats the positive voltage and the negative voltage, to the vibrating body 2.

The applied voltage may be, for example, a wavy voltage or may be a pulse-like voltage.

Motion of the Rotor 5

The vibrating body 2 rotates the rotor 5 in the second driving mode.

Specifically, when the vibrating body 2 is vibrated as shown in FIG. 5, the vibrating body 2 vibrates such that the projection 26 draws the elliptical track indicated by the arrow DL. Therefore, the rotor 5 rotates counterclockwise as indicated by an arrow SR in FIG. 5 with a frictional force received from the projection 26.

On the other hand, when the vibrating body 2 is vibrated as shown in FIG. 6, the vibrating body 2 vibrates such that the projection 26 draws the elliptical track indicated by the arrow DR. Therefore, the rotor 5 rotates clockwise as indicated by an arrow SL in FIG. 6 with a frictional force received from the projection 26.

In this way, the rotor 5 rotates clockwise or counterclockwise according to the vibration of the vibrating body 2.

Control System

In the piezoelectric actuator 1, in the first driving mode, as a control system in causing the vibrating body 2 to perform the longitudinal vibration, it is preferable to adopt current control for controlling the magnitude of an electric current supplied to the piezoelectric elements 22 and 24. In the current control, the electric current supplied to the piezoelectric elements 22 and 24 are controlled to be constant.

When a total area of the electrodes to be energized increases, the impedance of the piezoelectric elements 22 and during resonance of the vibrating body 2 decreases. Consequently, when voltage control for controlling the magnitude of a voltage applied to the piezoelectric elements 22 and 24 is adopted, the electric current (electric power) supplied to the piezoelectric elements 22 and 24 increases and a heat value in the piezoelectric elements 22 and 24 increases. When the heat value increases, depending on other conditions, the impedance of the piezoelectric elements 22 and 24 during the resonance of the vibrating body 2 further decreases, the electric current supplied to the piezoelectric elements 22 and 24 further increases, and the vibration of the vibrating body 2 becomes unstable.

On the other hand, by adopting the current control, it is possible to reduce the heat value of the piezoelectric elements 22 and 24 compared with a case where the voltage control is adopted. Consequently, it is possible to suppress the decrease in the impedance of the piezoelectric elements 22 and 24 during the resonance of the vibrating body 2, stabilize vibration, and reduce power consumption.

On the other hand, in the second driving mode, as a control system in causing the vibrating body 2 to perform the combined vibration of the bending vibration and the longitudinal vibration, for example, voltage control for controlling the magnitude of a voltage applied to the piezoelectric elements 22 and 24 is adopted.

As explained above, with the piezoelectric actuator 1, in the first driving mode, since the vibrating body 2 performs the longitudinal vibration, it is possible to markedly reduce retention of the projection 26 of the vibrating body 2 acting on the rotor 5 without displacing the rotor 5 and compared with the non-driven state. Consequently, when it is attempted to rotate the rotor 5 with external force other than the force of the piezoelectric actuator 1, it is possible to easily and surely rotate the rotor 5. Therefore, for example, if the piezoelectric actuator 1 is applied to a robot and used to a driving source for joints of the robot, in teaching the root, by causing the vibrating body 2 to perform the longitudinal vibration, it is possible to easily and surely bend and stretch the joints of the robot with the external force. Consequently, it is possible to easily and surely perform the teaching.

In the second driving mode, since the vibrating body 2 performs the combined vibration, it is possible to rotate the rotor 5.

Since the first frequency, the second frequency, and the third frequency are frequencies different from one another, it is possible to vibrate the vibrating body 2 in the respective modes at optimum frequencies. Therefore, it is possible to increase the magnitudes of the vibrations in the respective modes. Consequently, in the first driving mode, since the vibrating body 2 performs the longitudinal vibration, it is possible to further reduce the frictional force between the vibrating body 2 and the rotor 5.

Second Embodiment

FIG. 7 is a perspective view showing a vibrating body of a piezoelectric actuator according to a second embodiment of the invention.

Concerning the second embodiment, differences from the first embodiment are mainly explained. Explanation of similarities is omitted. As in the first embodiment, concerning electrodes for longitudinal vibration, electrodes for longitudinal vibration in the electrodes 21a, 21b, 21c, 21d, and 21e are representatively explained.

As shown in FIG. 7, in the piezoelectric actuator 1 in the second embodiment, the vibrating body 2 is formed in a rectangular plate shape. The vibrating body 2 is configured by stacking, in order from the upper side in FIG. 7, five electrodes 21a, 21b, 21c, 21d, and 21e, the tabular piezoelectric element 22, the vibrating plate (the shim) 23, which is a reinforcing plate, including the projection (the contact section) 26 and the pair of coupling sections 27 and 28, the tabular piezoelectric element 24, and the five electrodes 25a, 25b, 25c, 25d, and 25e (in FIG. 7, the electrodes 25a, 25b, and 25e are not shown and only the reference signs are shown in parentheses). Note that, in FIG. 7, the thickness direction is shown in exaggeration.

The upper surface of the piezoelectric element 22 is substantially equally divided into six rectangular regions, that is, divided into two in the X-axis direction and divided into three in the Y-axis direction. In the divided four regions at both the ends in the Y-axis direction, the electrodes 21a, 21b, 21c, and 21d formed in a rectangular shape are respectively set. The electrode 21e formed in a rectangular shape about twice as long as the electrodes 21a, 21b, 21c, and 21d is set to extend across in the two regions in the center portion in the Y-axis direction on the upper surface of the piezoelectric element 22. Note that the electrodes 21a, 21b, 21c, 21d, and 21e are separated from one another.

Similarly, the lower surface of the piezoelectric element 24 is substantially equally divided into six rectangular regions, that is, divided into two in the X-axis direction and divided into three in the Y-axis direction. In the divided four regions at both the ends in the Y-axis direction, the electrodes 25a, 25b, 25c, and 25d formed in a rectangular shape are respectively set. The electrode 25e formed in a rectangular shape about twice as long as the electrodes 25a, 25b, 25c, and 25d is set to extend across in the two regions in the center portion in the Y-axis direction on the lower surface of the piezoelectric element 24. Note that the electrodes 25a, 25b, 25c, 25d, and 25e are separated from one another.

The electrodes 21a, 21b, 21c, 21d, and 21e are disposed symmetrically with respect to the first straight line 91 and disposed symmetrically with respect to the second straight line 92. Similarly, the electrodes 25a, 25b, 25c, 25d, and 25e are disposed symmetrically with respect to the first straight line 91 and disposed symmetrically with respect to the second straight line 92.

The electrode 21a and the electrode 25a, the electrode 21b and the electrode 25b, the electrode 21c and the electrode 25c, the electrode 21d and the electrode 25d, and the electrode 21e and the electrode 25e are respectively disposed to be opposed to each other in the thickness direction of the vibrating body 2. As shown in FIG. 7, the electrode 21a and the electrode 25a located on the rear side of the electrode 21a, the electrode 21b and the electrode 25b located on the rear side of the electrode 21b, the electrode 21c and the electrode 25c located on the rear side of the electrode 21c, the electrode 21d and the electrode 25d located on the rear side of the electrode 21d, and the electrode 21e and the electrode 25e located on the rear side of the electrode 21e are respectively electrically connected.

In the first driving mode, a part (hereinafter referred to as electrodes for longitudinal vibration) of the electrodes 21a, 21b, 21c, 21d, 21e, 25a, 25b, 25c, 25d, and 25e, in this embodiment, the electrode 21e and 25e are energized. Consequently, the entire vibrating body 2 performs the longitudinal vibration along the X-axis direction in the XY plane.

Even if all of the electrodes 21a, 21b, 21c, 21d, 21e, 25a, 25b, 25c, 25d, and 25e are energized, the vibrating body 2 performs the longitudinal vibration. However, by energizing only the electrodes 21e and 25e, compared with a case where all the electrodes are energized, it is possible to increase the impedance of the piezoelectric elements 22 and 24 during the resonance of the vibrating body 2. Consequently, it is possible to stabilize vibration and reduce power consumption.

Note that, in the first driving mode, all of the electrodes 21a, 21b, 21c, 21d, 21e, 25a, 25b, 25c, 25d, and 25e may be energized. In this case, it is preferable to adopt the current control as explained in the first embodiment.

In the second driving mode, a part of the electrodes 21a, 21b, 21c, 21d, 21e, 25a, 25b, 25c, 25d, and 25e, in this embodiment, the electrodes 21a, 21c, 21e, 25a, 25c, and 25e or the electrodes 21b, 21d, 21e, 25b, 25d, and 25e are energized. Consequently, as shown in FIG. 5, the vibrating body 2 vibrates such that the projection 26 draws an elliptical track (a first elliptical track) indicated by the arrow DL (clockwise on the drawing). Alternatively, as shown in FIG. 6, the vibrating body 2 vibrates such that the projection 26 draws an elliptical track (a second elliptical track) indicated by the arrow DR (counterclockwise on the drawing).

According to the second embodiment, effects same as the effects in the first embodiment can be obtained.

Third Embodiment

FIG. 8 is a plan view showing a piezoelectric actuator according to a third embodiment of the invention.

Concerning the third embodiment, differences from the first embodiment are mainly explained. Explanation of similarities is omitted.

As shown in FIG. 8, the piezoelectric actuator 1 in the third embodiment includes, as the driven body, a driven body having a longitudinal cross sectional shape, that is, a slider 8 instead of the rotor 5.

The slider 8 is formed in a bar shape, the shape of the cross section of which is substantially square, that is, a substantial rectangular parallelepiped long in one direction. The slider 8 is set to be movable (displaceable) in the longitudinal direction (the axial direction) thereof. The piezoelectric actuator 1 is a device in which the vibrating body 2 vibrates to thereby transmit power (a driving force) to the slider 8 and move (drive) the slider 8. A moving direction 96 of a contact portion of the slider 8 with the projection 26 of the vibrating body 2 and a vibrating direction 93 of longitudinal vibration of the vibrating body 2 and a vibrating direction 94 of the longitudinal vibration in a contact portion of the projection 26 of the vibrating body 2 with the slider 8 are orthogonal to each other.

In the slider 8, two rollers 80a and 80b and two projections (movement regulating means) 83a and 83b that regulate the movement of the slider 8 are provided.

The two rollers 80a and 80b are juxtaposed in the left-right direction in FIG. 8 to be separated a predetermined distance away from each other. The two rollers 80a and 80b are respectively supported by shafts 81a and 81b, which are located in the centers of the rollers 80a and 80b, on one surface (the upper side in FIG. 8) of the slider 8 in a posture parallel to the slider 8 to be rotatable in both the forward and backward directions.

On the circumferential surfaces (outer circumferential surfaces) of the rollers 80a and 80b, grooves 82a and 82b are respectively formed along the outer circumferences. The slider 8 is disposed (located) in the groove 82a of the roller 80a and the groove 82b of the roller 80b.

The projection 83a is located at an end portion further on the left side in FIG. 8 than the roller 80a of the slider 8. The projection 83b is located at an end portion further on the right side in FIG. 8 than the roller 80b of the slider 8.

Note that the positions and the number of projections are not limited to those described above. For example, the projections may be disposed between the two rollers 80a and 80b. The number of projections may be one. The number of rollers is not limited to two.

According to the third embodiment, effects same as the effects in the first embodiment can be obtained.

The third embodiment can also be applied to the second embodiment.

The piezoelectric actuators in the embodiments of the invention are explained with reference to the drawings. However, the invention is not limited to the embodiments. The components can be replaced with any components having the same functions. Any other components may be added to the invention.

The invention may be a combination of any two or more configurations (features) in the embodiments.

In the embodiments, the number of electrodes provided on one surface (a surface on the opposite side of the vibrating plate) of one piezoelectric element is four or five. However, in the invention, the number of electrodes is not limited to the number and may be, for example, six or more.

In the embodiments, the leaf springs are used as the urging section. However, the invention is not limited to the leaf springs. For example, coil springs or the like may be used.

In the embodiments, as the driven body, the rotor and the slider are explained as the examples. However, the driven body is not limited to the rotor and the slider. The shape of the cross section of the rotatable driven body is not limited to the circular shape and may be, for example, a polygonal shape such as an icosagonal shape. The shape of the cross section of the movable driven body is not limited to the square shape long in one direction and may be, for example, a curved bar shape. The driven body may be a rigid body or may have flexibility.

Uses of the piezoelectric actuators in the embodiments are not particularly limited. The piezoelectric actuators can be used for driving of predetermined parts of various devices such as driving of joints of various robots and driving of various end effectors such as hands.

The entire disclosure of Japanese Patent Application No. 2014-093407, filed Apr. 30, 2014 is expressly incorporated by reference herein.

What is claimed is:

1. A piezoelectric actuator comprising:
   a piezoelectric element that extends in a first direction;
   a vibrating plate that extends in the first direction, the vibrating plate being provided on the piezoelectric element, the vibrating plate being configured to vibrate according to application of a signal to the piezoelectric element;
   a projection that is provided at an end of the vibrating plate, the projection projecting in the first direction from the end of the vibrating plate; and
   a driven body driven by the vibration of the vibrating plate, the driven body being physically connected to the projection, wherein
   the vibrating plate vibrates in a first mode according to a signal having a first frequency, vibrates in a second mode according to a signal having a second frequency, and vibrates in a third mode according to a signal having a third frequency,
   the first frequency and the second frequency are different, and the first frequency and the third frequency are different, and
   the vibration in the second mode is bending vibration, the vibration in the third mode is longitudinal vibration, and the vibration in the first mode is combined vibration of the bending vibration and the longitudinal vibration.

2. The piezoelectric actuator according to claim 1, further comprising a plurality of electrodes provided in the piezoelectric element, wherein
   when the vibrating plate is vibrated in the third mode, the signal having the third frequency is applied to the plurality of electrodes.

3. The piezoelectric actuator according to claim 2, wherein, when the vibrating plate vibrates in the third mode, magnitude of an electric current supplied to the piezoelectric element is controlled.

4. The piezoelectric actuator according to claim 1, further comprising a plurality of electrodes provided in the piezoelectric element, wherein
   when the vibrating plate vibrates in the third mode, the signal having the third frequency is applied to a part of the plurality of electrodes.

5. The piezoelectric actuator according to claim 1, wherein
   the driven body is rotatably connected to the projection, and
   a vibrating direction of the vibration in the third mode in a contact portion of the vibrating plate with the projection is a direction toward a rotation center of the driven body.

6. The piezoelectric actuator according to claim 1, wherein
   the driven body is movably connected to the projection, and
   a moving direction of a contact portion of the driven body with the projection and a vibrating direction of the vibration in the third mode are orthogonal to each other.

* * * * *